March 4, 1958 J. A. PAGE 2,825,414
IMPELLER BLADE ASSEMBLY
Filed Dec. 28, 1956 2 Sheets-Sheet 1

INVENTOR.
JOSEPH A. PAGE,
BY
McMorrow, Berman & Davidson
ATTORNEYS.

March 4, 1958 J. A. PAGE 2,825,414
IMPELLER BLADE ASSEMBLY
Filed Dec. 28, 1956 2 Sheets-Sheet 2

INVENTOR.
JOSEPH A. PAGE,
BY
McMorrow, Berman + Davidson
ATTORNEYS.

United States Patent Office

2,825,414
Patented Mar. 4, 1958

2,825,414

IMPELLER BLADE ASSEMBLY

Joseph A. Page, Portland, Maine

Application December 28, 1956, Serial No. 631,130

2 Claims. (Cl. 170—170)

This invention relates generally to an improved impeller blade assembly for use on a rotating shaft incorporating a woodworking tool or the like on the terminal end thereof, said impeller blade assembly incorporating means for urging air toward the longitudinal axis of a rotary shaft for directing air toward a tool for the purpose of cooling the same, the air also serving to move wood chips or the like away from a work piece being worked upon in order that an operator may more readily observe the condition of such a work piece.

A still further object of invention in conformance with that set forth is to provide an impeller blade or fan assembly incorporating a support hub including complimentary portions secureable in circumposed relationship about an intermediate portion of a rotary shaft, said support hub having extending from opposite sides thereof means for clampingly engaging oppositely disposed blade elements, said blade elements incorporating means for urging air along the longitudinal axis of rotation of the support hub for the purposes heretofore mentioned.

And yet another object of invention in conformance with that set forth is to provide an impeller or fan blade assembly of the character involved which is readily and economically manufactured, easily installed, and highly practical and serviceable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1:
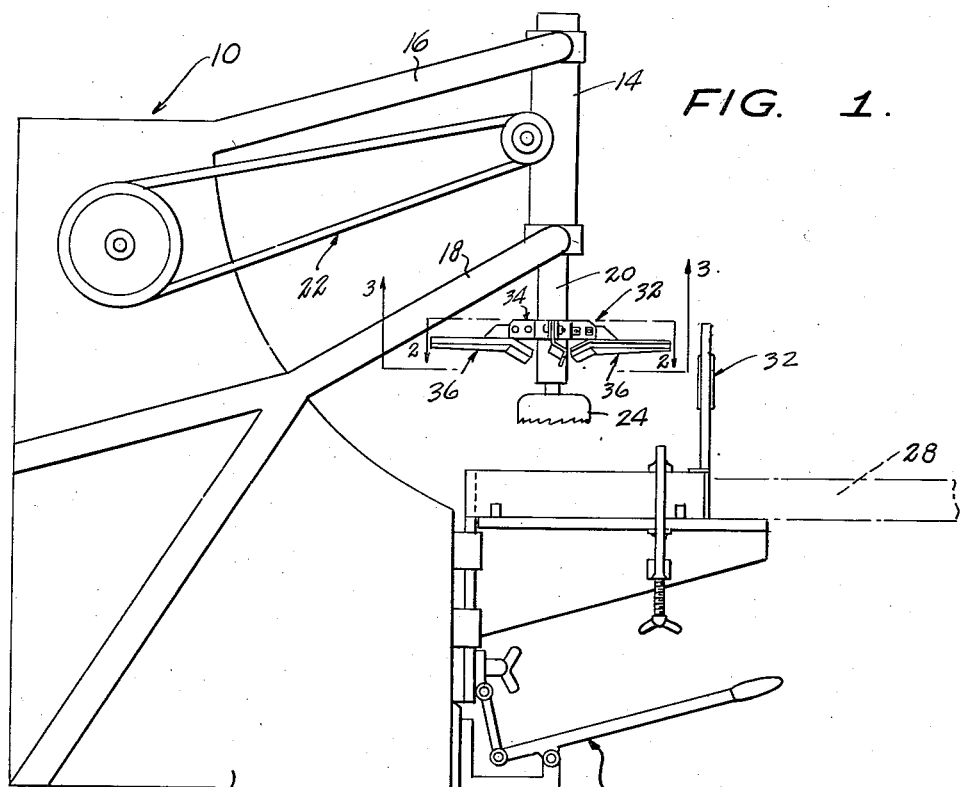
Figure 1 is an elevational view of a router utilized for cutting the pockets in the frame of a pool table, for example, said router incorporating on the rotary shaft thereof the impeller blade assembly of the invention.
Figure 2:
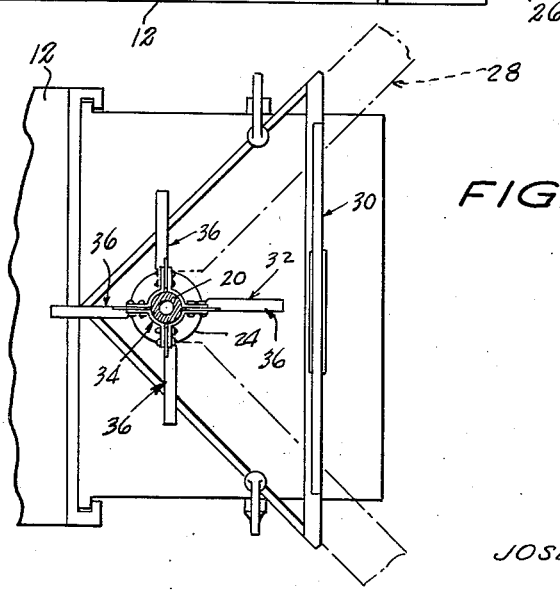
Figure 2 is a fragmentary horizontal section taken substantially on the plane of line 2—2 of Figure 1.

Referring to the drawing in detail, considering Figures 1 and 2, indicated generally at 10 is a router incorporating a suitable support base 12 incorporating a vertical support sleeve 14 suitably braced at 16 and 18, said sleeve incorporating a suitably journalled rotary shaft 20, power driven by means of an endless belt type drive indicated generally at 22, said rotary shaft 20 incorporating on the lower end thereof a suitable router blade 24. Indicated generally at 26 is a vertically adjustable jig assembly for supporting thereon beneath the router blade 24 the frame of a pool table indicated generally at 28 which will have cut in the corners thereof the pockets of the pool table as clearly seen in Figure 2. The jig is vertically adjustable and incorporates a vertically extending transparent shield or guard assembly indicated generally at 30. The aforementioned structure is conventional, and accordingly further description is believed to be unnecessary.

Indicated generally at 32 is an impeller or fan blade assembly. The impeller blade assembly 32 incorporates a support hub indicated generally at 34 and a plurality of radially extending blade elements 36. Although the exemplary embodiment discloses an impeller assembly incorporating four blade elements 36, the impeller blade assembly will also operate utilizing two oppositely or diametrically opposed blade elements 36.

The support hub 34 incorporates complimentary collar portions 38 including an intermediate arcuate support portion 40 terminating in diverging clamp plates 42. The clamp plates 42 have extending transversely therethrough suitable apertures 44 for receiving therethrough retaining nut and bolt assemblies 46. The complimentary collar portions 38 define the support hub 34 which will be secured in circumposed relationship about an intermediate portion of a rotary shaft 20.

Figure 3:
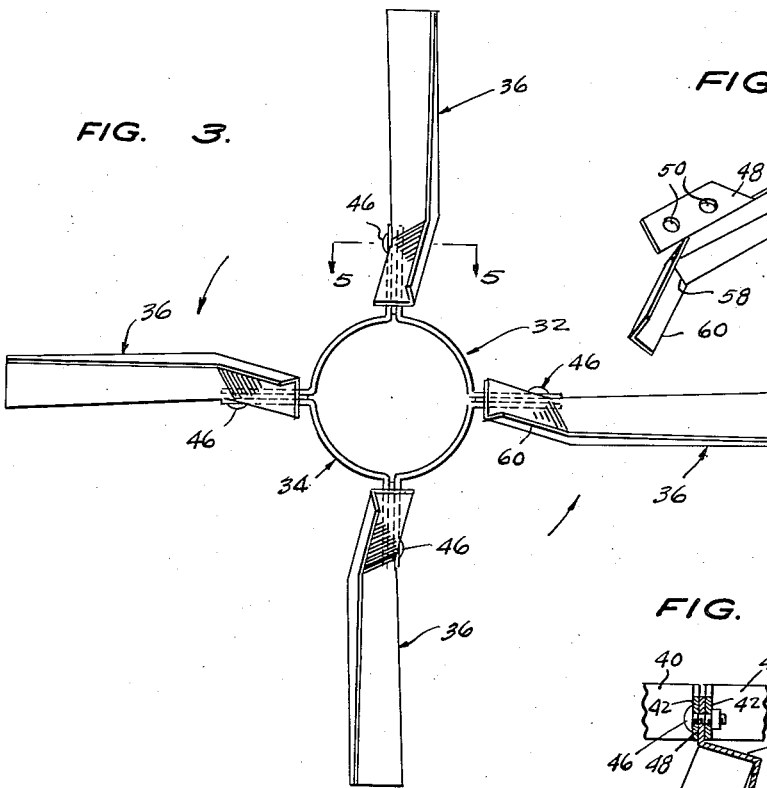
Figure 3 is a fragmentary enlarged horizontal section of the impeller or fan blade taken substantially on the plane of line 3—3 of Figure 1.
Figure 4:
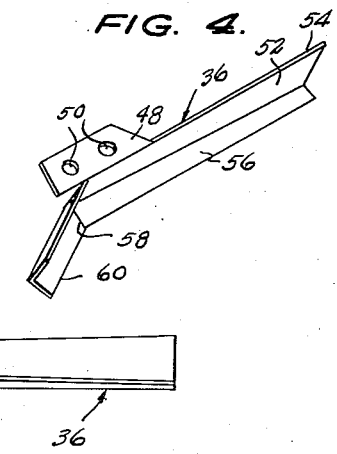
Figure 4 is a perspective view of one of the blade elements of the impeller blade assembly.
Figure 5:
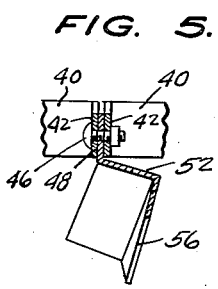
Figure 5 is a fragmentary section taken substantially on the plane of line 5—5 of Figure 3.
Figure 6:
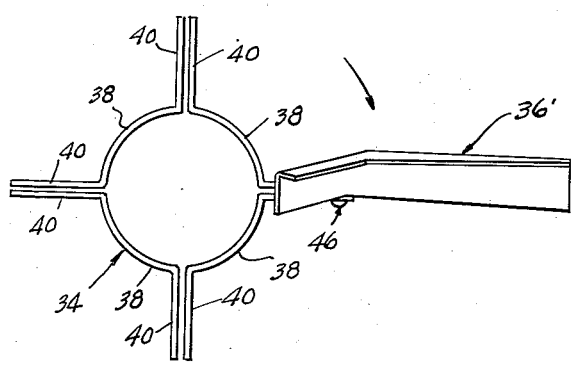
Figure 6 is a view similar to Figure 3, showing a single blade element on a support hub, this blade element being of the character which would be rotated in a direction opposite to that of the impeller blade assembly of Figure 3.
Figure 7:
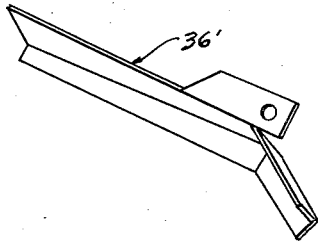
Figure 7 is a perspective view, similar to Figure 4, showing the blade element of Figure 6 in detail.
Figure 8:
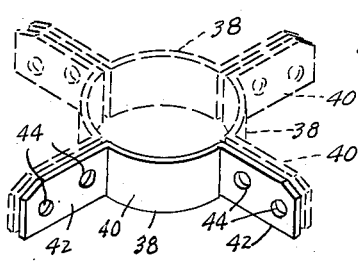
Figure 8 is a perspective view of the support hub of the impeller blade assembly, one of the complimentary portions being shown by means of solid lines, the others of which being shown by means of dotted lines.

The blade elements 36 incorporate an integral mounting plate 48 including transverse apertures 50 therethrough for alignment with the apertures 44 in the clamp plates 42 of the support hub, the nut and bolt assemblies 46 being utilized to retain the blade elements 36 in fixed relation on the support hub. Depending from the mounting plate 48 is a top plate member 52 which is in obtuse angular relationship relative to the general plane of the mounting plate 48, see Figure 5, for example, the forward edge of the plate 52 as indicated at 54 constituting the leading edge of the blade elements. The plates 52 have depending therefrom in normal relationship thereto a flange 56. The blade elements 36 incorporate in the plate 52 and flange 56 a transverse intermediate bend portion 58 providing on each blade element a directing or baffle portion 60, these portions 60 on opposite sides of the support hub 34 converging toward each other in intersecting relationship relative to the longitudinal axis of a rotary shaft upon which the impeller blade assembly is mounted i. e. toward the axis of rotation of the impeller blade assembly. The blade elements 36 constitute scoop elements which during rotation with the rotary shaft upon which they are mounted will urge air toward the longitudinal axis of rotation of the impeller blade assembly. Indicated generally at 36' in Figures 6 and 7 are blade elements which will permit rotation in a direction opposite that of the impeller blade assembly shown in Figure 3. The blade elements 36' will be utilized on a support hub 34 similar to that previously described.

If desired, the blade elements 36 may be constructed of a semi-rigid material wherein accidental contact of an operator with the blade elements will not seriously injure the operator.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. For use on a rotary shaft of wood working apparatus or the like, an impeller blade assembly comprising a support clamp including complimentary portions circumpositionable about an intermediate portion of a rotary shaft, said support clamp including fastening means for retaining the complimentary portions on the shaft, and at least one pair of blade elements secured to the support clamp by said fastening means on opposite sides thereof for rotation about the longitudinal axis of the rotary shaft, said blade elements including means for urging air inwardly along the longitudinal axis of the blade elements toward the axis of rotation of the impeller blade assembly during rotation of the shaft, the blade elements including a mounting plate engaged by said fastening means and an elongated scoop depending from the mounting plate, said scoop comprising a top plate portion, one edge of the top plate portion defining the leading edge of the blade elements, said top plate portion extending rearwardly from the leading edge in obtuse angular relationship relative to the mounting plate of the blade elements, the trailing edge of the blade elements terminating in a depending flange portion substantially normal to the top plate portion, said blade elements including intermediate angular inner end portions converging toward each other from opposite sides of the support clamp.

2. An impeller blade assembly for use on a rotary shaft comprising a support hub including complimentary collar portions including fastening means for detachably securing the same about an intermediate portion of the rotary shaft, said collar portions including cooperating juxtaposed clamp plate portions extending in co-planar opposed relationship from opposite sides of the support hub and the axis of rotation of said hub on the rotary shaft, at least one pair of opposed blade elements extending from the clamp plate portions on opposite sides of the support hub, said blade elements comprising elongated air scoops, said air scoops incorporating a transverse angular bend portion converging from opposite sides of the support hub for directing air along the axis of rotation of the support hub, said air scoops including a first flange extending angularly away from the plane of the clamp plate portions defining the leading edge of the blade elements, the first flange continuing in a depending flange normal thereto providing a resistance of movement of the blade elements through the air and urging air radially toward the axis of rotation of the impeller assembly.

References Cited in the file of this patent

UNITED STATES PATENTS

| | | |
|---|---|---|
| 808,174 | Slear et al. | Dec. 26, 1905 |
| 887,908 | Barby | May 19, 1908 |
| 1,635,769 | Royle | July 12, 1927 |
| 1,820,448 | Davy | Aug. 25, 1931 |
| 2,385,070 | Gant | Sept. 18, 1945 |
| 2,628,017 | Zaino | Feb. 10, 1953 |